United States Patent [19]

Watson

[11] Patent Number: 5,390,858

[45] Date of Patent: Feb. 21, 1995

[54] REMOTELY CONTROLLED, MOVING SPRINKLER APPARATUS

[76] Inventor: Galen T. Watson, Highway 129 South, Trenton, Fla. 32693

[21] Appl. No.: 123,262

[22] Filed: Sep. 20, 1993

[51] Int. Cl.$^6$ .............................................. B05B 3/18
[52] U.S. Cl. ................... 239/744; 239/745; 239/242
[58] Field of Search ............... 239/743, 745, 748, 227, 239/242, 233, 744

[56] References Cited

U.S. PATENT DOCUMENTS

| | | | |
|---|---|---|---|
| 3,559,887 | 2/1971 | Meyer | 239/233 |
| 3,583,636 | 6/1971 | Lacey | 239/745 |
| 3,669,353 | 6/1972 | Hanson et al. | 239/233 |
| 3,682,387 | 8/1972 | Filan | 239/745 |
| 3,741,238 | 6/1973 | Lacey | 239/745 |
| 4,003,519 | 1/1977 | Kruse et al. | 239/745 |
| 4,346,843 | 8/1982 | Long et al. | 239/745 |

*Primary Examiner*—David M. Mitchell
*Assistant Examiner*—Christopher G. Trainor

[57] ABSTRACT

A new and improved rotatable and oscillatable sprinkler apparatus is provided for use on a trolley pulled across a field to be sprayed with water. A rotation direction control assembly controls direction of rotation of a rotatable portion of a rotatable sprinkler head assembly. The rotation direction control assembly includes a revolving control element connected to the rotatable portion of the rotatable sprinkler head assembly. The rotation direction control assembly also includes a remotely controlled spray pattern selection assembly which controls a water spray pattern on the field by the remotely controlled spray pattern selection assembly contacting the revolving control element. The remotely controlled spray pattern selection assembly includes a first portion located adjacent to the stationary portion of the rotatable sprinkler head assembly. A second portion of the first remotely controlled spray pattern selection assembly is attached to the trolley. The first portion is responsive to the second portion and to a field-positioned actuator located at a selected position in the field. The field-positioned actuator actuates the second portion of the remotely controlled spray pattern selection assembly as the trolley is pulled across the field. The second portion actuates the first portion of the remotely controlled spray pattern selection assembly, and the first portion contacts the revolving control element of the rotatable sprinkler head assembly for controlling direction of rotation of the rotatable sprinkler head assembly, such that a water spray pattern is controlled on the field as the trolley is pulled across the field.

5 Claims, 6 Drawing Sheets

REMOTELY CONTROLLED, MOVING SPRINKLER APPARATUS

BACKGROUND OF THE INVENTION

1. Field of the Invention

The present invention relates generally to water sprinkler devices, and, more particularly, to high capacity agricultural irrigation sprinklers that travel along a field that is under irrigation.

2. Description of the Prior Art

Irrigation of crop fields is a widely employed technique in present day agriculture. U.S. Pat. No. 3,559,887 discloses a sprinkler head used in agricultural irrigation. One irrigation technique employs a sprinkler that is placed on a trolley that is pulled along a straight line down the middle of a rectangular field. The rectangular field has a length and a width; that is, the field has two length sides and two width sides. The straight line extends along the length of the field between the midpoints of the respective width sides. Thus, the straight line is a center line dividing the field into two halves. As the trolley and the sprinkler travel along the center line, the sprinkler has a rotating and oscillating portion which sprays water in a repeating, oscillating pattern that is an approximately 180 degree half circular pattern on the field. With this repeating, 180 degree half circular pattern over the entire field, some of field areas, especially in mid-field, get more water than desired. As a result, there is a tendency of water to pool and puddle in the middle portions of the field. In this respect, it would be desirable if an irrigation device for a field were provided which prevented water from pooling and puddling in middle portions of a field.

In using the trolley and sprinkler, the trolley and sprinkler are generally placed at a first width side, distal to a motorized spooler, and pulled by the motorized spooler toward the second width side, proximal to the motorized spooler. The motorized spooler spools the water hose that is connected to a water source at one end to the sprinkler at the other end. The motorized spooler is generally connected to a tractor. As the trolley and sprinkler get closer to the motorized spooler and the nearby tractor, the spray pattern from the sprinkler drenches the motorized spooler and the tractor. In this respect, it would be desirable if an irrigation device for a field were provided which did not spray the motorized spooler and the tractor when the trolley and the sprinkler are near the spooler and tractor.

The circular pattern has a radius that is approximately equal to one-half the width of the field. Therefore, as the trolley and sprinkler move down the center line, the field is wetted along its entire width in a pattern of advancing arcs.

For purposes of discussion, assume that the length of the field is L and that the width of the field is W. This means that the radius of the circular pattern provided by the sprinkler is $(\frac{1}{2})W$. When the trolley and sprinkler reach one end of the center line at one width side of the field, the trolley and sprinkler are located at a center of a circle having a radius of $(\frac{1}{2})W$. If the sprinkler is set to operate to rotate a full circle of 360 degrees, then the sprinkler sprays a surface area $A = 2(PI)(\frac{1}{2})W$. One half of this surface area covers the field. However, one half of this surface area is outside the field. The same situation develops when the trolley and the sprinkler reach the other end of the center line at the second width side of the field. That is, at the second width side of the field, one half of the surface area sprayed by the sprinkler located at the midpoint of the second width side of the field is outside the field.

Thus, it can be seen, that with this irrigation arrangement, taking both width sides of the field into consideration, a total surface area that is outside the field that is sprayed by the sprinkler is $A = 2(PI)(\frac{1}{2})W$. For a typical field, having a width W of approximately 850 feet, the surface area A that is outside the field is, in accordance with the above-mentioned formula is 2,670 square feet. This fact results in a large waste of water in spraying areas that are not part of the field. Waste of water can be a serious waste of a precious resource. Also waste of water can be a very expensive waste of money. More specifically, 30,000 to 40,000 gallons of water can be wasted in a single night by not falling upon the field. In this respect, it would be desirable if an irrigation device for a field were provided which reduced waste of water by not spraying surface areas that are not part of the field.

Aside from the large waste of water, the areas outside the field may not be suitable for being wetted by the sprinkler. For example, the areas outside the field may be a road or highway. The area outside the field may include a house or shed. The area outside the field may include another person's property. So it can be seen, for a number of reasons, it would be desirable if the surface area sprayed outside the area of the field could be kept at a minimum or completely eliminated.

Problems in sprinkler spraying patterns could theoretically be remedied by a person periodically traveling to the trolley and sprinkler and manually making changes in sprinkler operation. However, such a theoretical possibility is not practical. It would require a person to walk long distances along a field, and it would also subject the person to drenching spraying as the person approached the trolley and sprinkler. In this respect, it would be desirable if an irrigation device for a field were provided which changed spraying patterns of the sprinkler without requiring a person to walk long distances along a field and without subjecting the person to drenching spraying.

To prevent a person from being drenched by sprinkler spraying, one could theoretically turn off the water supply when changes to the sprinkler were made manually. However, such a theoretically possibility is not practical. It is more practical not to turn off the irrigation water supply when changes to the sprinkler spraying patterns are made.

Often an irrigation sprinkling operation is carried out at night for maximum irrigating effect. Most people sleep at night, so it would be desirable if an irrigation system could operate automatically so that the irrigation system could be used at night without being attended to by personnel.

Thus, while the foregoing body of prior art indicates it to be well known to use sprinklers in agricultural irrigation systems, the prior art described above does not teach or suggest a remotely controlled, moving sprinkler apparatus which has the following combination of desirable features: (1) reduces waste of water by not spraying surface areas that are not part of a field; (2) keeps to a minimum or completely eliminates the surface area sprayed outside the area of the field; (3) prevents water from pooling and puddling in middle portions of the field; (4) does not spray the motorized spooler and the tractor when the trolley and the sprinkler are near the spooler and tractor; (5) changes spraying patterns of the sprinkler without requiring a person to walk long distances along a field and without subjecting the person to being drenched by water from the sprinkler; (6) does not require turning off the irrigation water supply when changes to the sprinkler spraying patterns are made; and (7) permits an irrigation system to operate automatically so that the irrigation system can be used at night without being attended to by personnel. The foregoing desired characteristics are provided by the unique remotely controlled, moving sprinkler apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved sprinkler apparatus is provided for use on a trolley pulled across a field to be sprayed with water. The sprinkler apparatus includes a rotatable sprinkler head assembly carried by the trolley. The rotatable sprinkler head assembly includes a stationary portion supported by the trolley and includes a rotatable portion, supported by the stationary portion, which is capable of rotating unidirectionally in repetitive full circles. The rotatable portion is also capable of oscillating bidirectionally in partially circular arcs. A rotation direction control assembly controls direction of rotation of the rotatable portion of the rotatable sprinkler head assembly. The rotation direction control assembly includes a revolving control element connected to the rotatable portion of the rotatable sprinkler head assembly. The rotation direction control assembly also includes a remotely controlled spray pattern selection assembly which includes a first portion located adjacent to the stationary portion of the rotatable sprinkler head assembly. The rotation direction control assembly controls a water spray pattern on the field by the remotely controlled spray pattern selection assembly contacting the revolving control element.

The remotely controlled spray pattern selection assembly includes a first portion located adjacent to the stationary portion of the rotatable sprinkler head assembly. A second portion of the first remotely controlled spray pattern selection assembly is attached to the trolley. The first portion is responsive to the second portion and to a field-positioned actuator located at a selected position in the field. The field-positioned actuator actuates the second portion of the remotely controlled spray pattern selection assembly as the trolley is pulled across the field. The second portion actuates the first portion of the remotely controlled spray pattern selection assembly, and the first portion contacts the revolving control element of the rotatable sprinkler head assembly for controlling direction of rotation of the rotatable sprinkler head assembly, such that a water spray pattern is controlled on the field as the trolley is pulled across the field.

The first portion of the remotely controlled spray pattern selection assembly includes a base plate supported by the stationary portion of the rotatable sprinkler head assembly. A pivoted trip plate is placed on top of the base plate. A pivot passes through the base plate and the pivoted trip plate for pivoting the pivoted trip plate, A set pin is provided that is capable of being placed through a base plate set aperture on the base plate and through a trip plate set aperture placed in registration with the base plate set aperture. A biasing spring is supported by the base plate and urges the pivoted trip plate out of a set state, in which the set pin is in position through the base plate set aperture and the trip plate set aperture, and into a tripped state in which the set pin has been removed from the base plate set aperture and trip plate set aperture.

A first control surface projects upward from the pivoted trip plate and is located proximal to the pivot. The first control surface contacts the revolving control element for reversing a direction of rotation of the rotatable portion of the rotatable sprinkler head assembly. A second control surface projects upward from the pivoted trip plate and is located distal to the pivot. The second control surface contacts the revolving control element for reversing the direction of rotation of the rotatable portion of the rotatable sprinkler head assembly.

The base plate includes a first stop element for limiting motion of the pivoted trip plate when the pivoted trip plate moves from a set state to a tripped state. The second portion of the first remotely controlled spray pattern selection assembly includes a cable is connected to the set pin. A trip weight is connected to the cable. A guide element receives the trip weight. A trip platform is capable of being positioned under the guide element and the trip weight for retaining the trip weight in a set state. A pivot is connected to the trip platform, and a trip lever is connected to the pivot, such that when the field-positioned actuator is contacted by the trip lever as the trolley is moved along the field, the trip platform is changed to a tripped state and the trip weight falls. The cable is pulled by the falling trip weight, and the set pin is pulled out from its position through the base plate set aperture and the trip plate set aperture.

The rotation direction control assembly includes a revolving control element connected to the rotatable portion of the rotatable sprinkler head assembly, a first remotely controlled spray pattern selection assembly which includes a first portion located adjacent to the stationary portion of the rotatable sprinkler head assembly, and a second remotely controlled spray pattern selection assembly which includes a first portion located adjacent to the stationary portion of the rotatable sprinkler head assembly.

The first remotely controlled spray pattern selection assembly includes a set state and a tripped state. The second remotely controlled spray pattern selection assembly includes a set state and a tripped state.

Water is sprayed in an oscillating, partially circular pattern of arcs on the field away from a first width side. This spray pattern occurs when the first remotely controlled spray pattern selection assembly is in a set state and the second remotely controlled spray pattern selection assembly is in a set state.

Water is sprayed in a unidirectional, full circular pattern on the field when, the first remotely controlled spray pattern selection assembly is in a tripped state and when the second remotely controlled spray pattern selection assembly is in a set state.

Water is sprayed in an oscillating, partially circular pattern on the field away from a second width side. This spray pattern occurs when, the first remotely controlled spray pattern selection assembly is in a tripped state and when the second remotely controlled spray pattern selection assembly is in a tripped state.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved remotely controlled, moving sprinkler apparatus which has all of the advantages of the prior art and none of the disadvantages.

It is another object of the present invention to provide a new and improved remotely controlled, moving sprinkler apparatus which may be easily and efficiently manufactured and marketed.

It is a further object of the present invention to provide a new and improved remotely controlled, moving sprinkler apparatus which is of durable and reliable construction.

An even further object of the present invention is to provide a new and improved remotely controlled, moving sprinkler apparatus which is susceptible of a low cost of manufacture with regard to both materials and labor, and which accordingly is then susceptible of low prices of sale to the consuming public, thereby making such remotely controlled, moving sprinkler apparatus available to the buying public.

Still yet a further object of the present invention is to provide a new and improved remotely controlled, moving sprinkler apparatus which reduces waste of water by not spraying surface areas that are not part of a field.

Still another object of the present invention is to provide a new and improved remotely controlled, moving sprinkler apparatus that keeps to a minimum or completely eliminates the surface area sprayed outside the area of the field.

Yet another object of the present invention is to provide a new and improved remotely controlled, moving sprinkler apparatus which prevents water from pooling and puddling in middle portions of the field.

Even another object of the present invention is to provide a new and improved remotely controlled, moving sprinkler apparatus that does not spray the motorized spooler and the tractor when the trolley and the sprinkler are near the spooler and tractor.

Still a further object of the present invention is to provide a new and improved remotely controlled, moving sprinkler apparatus which changes spraying patterns of the sprinkler without requiring a person to walk long distances along a field and without subjecting the person to being drenched by water from the sprinkler.

Yet another object of the present invention is to provide a new and improved remotely controlled, moving sprinkler apparatus that does not require turning off the irrigation water supply when changes to the sprinkler spraying patterns are made.

Still another object of the present invention is to provide a new and improved remotely controlled, moving sprinkler apparatus which permits an irrigation system to operate automatically so that the irrigation system can be used at night without being attended to by personnel.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 7 is a top view of the first and second trip mechanisms of the invention used with a sprinkler having a control rod which controls oscillation of the sprinkler, wherein FIG. 7 shows the status of the sprinkler near the width side farthest away from the motorized spooler.

FIG. 8 is a top view of the first and second trip mechanisms of the invention used with a sprinkler having a control rod which prevents oscillation of the sprinkler, wherein FIG. 8 shows the status of the sprinkler near the middle of the field.

FIG. 9 is a top view of the first and second trip mechanisms of the invention used with a sprinkler having a control rod which controls oscillation of the sprinkler, wherein FIG. 9 shows the status of the sprinkler near the width side nearest to the motorized spooler.

DESCRIPTION OF THE PREFERRED EMBODIMENT

With reference to the drawings, a new and improved remotely controlled, moving sprinkler apparatus embodying the principles and concepts of the present invention will be described.

Figure 1:
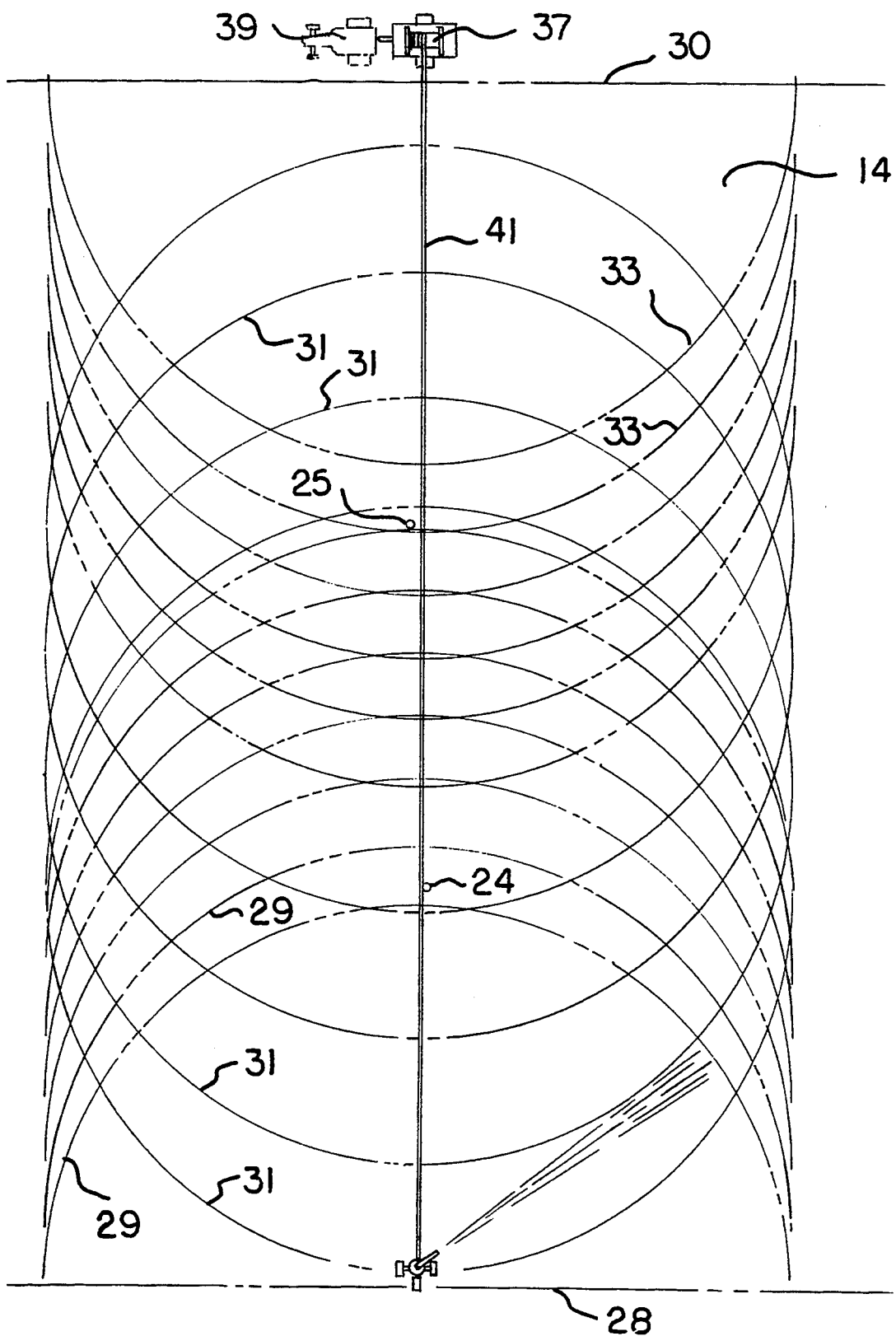
FIG. 1 is a schematic viewf spraying patterns on a rectangular field that result from using an embodiment of the remotely controlled, moving sprinkler apparatus of the invention on a trolley pulled by a water hose spooled onto a motorized spooler that is connected to a tractor.
Figure 2:
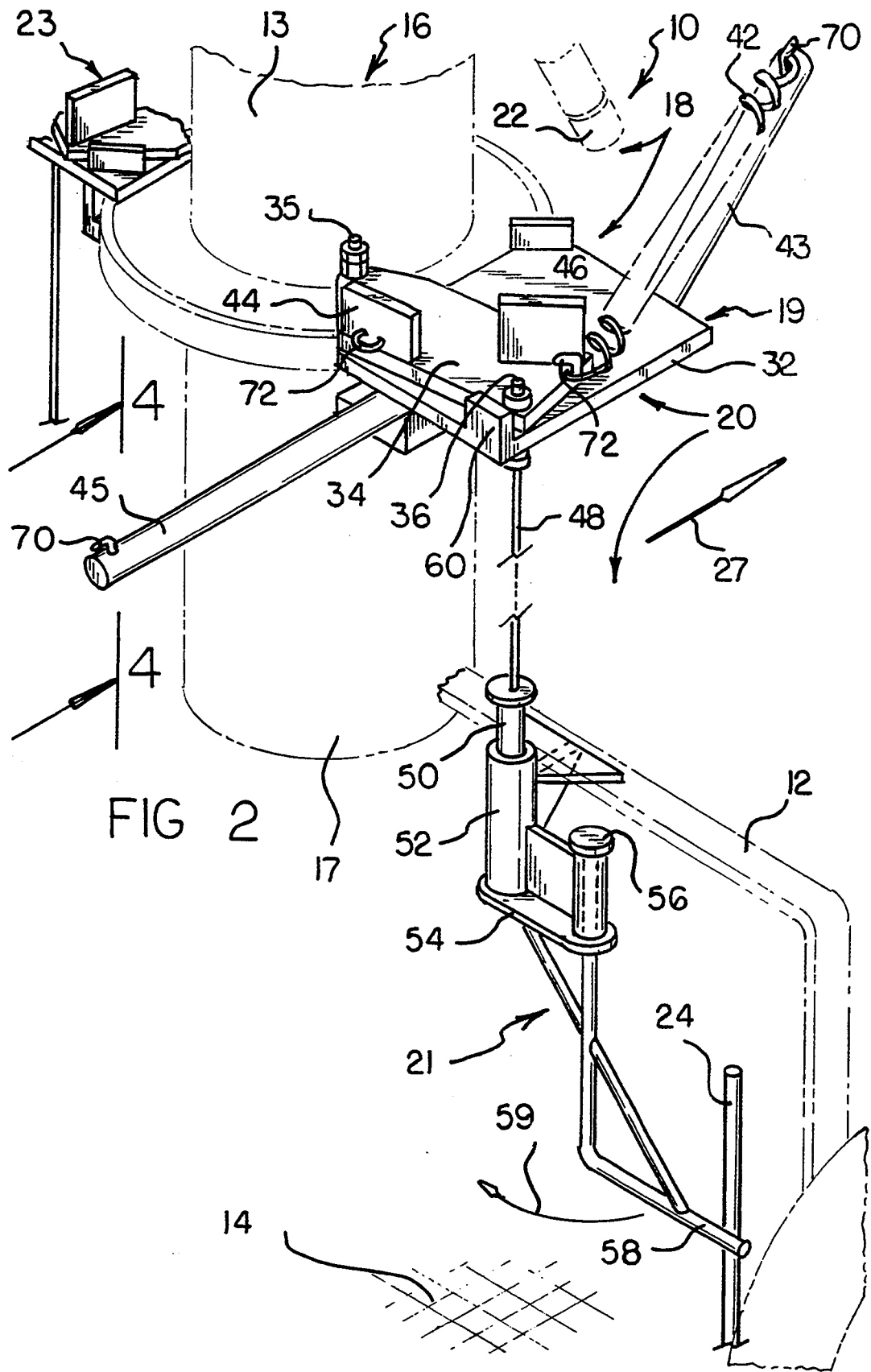
FIG. 2 is an enlarged perspective view of a first trip mechanism used with the embodiment of the invention shown in FIG. 1 wherein the trolley is being pulled toward the motorized spooler and wherein the first trip mechanism has not yet been tripped by a stake in the ground.
Figure 3:
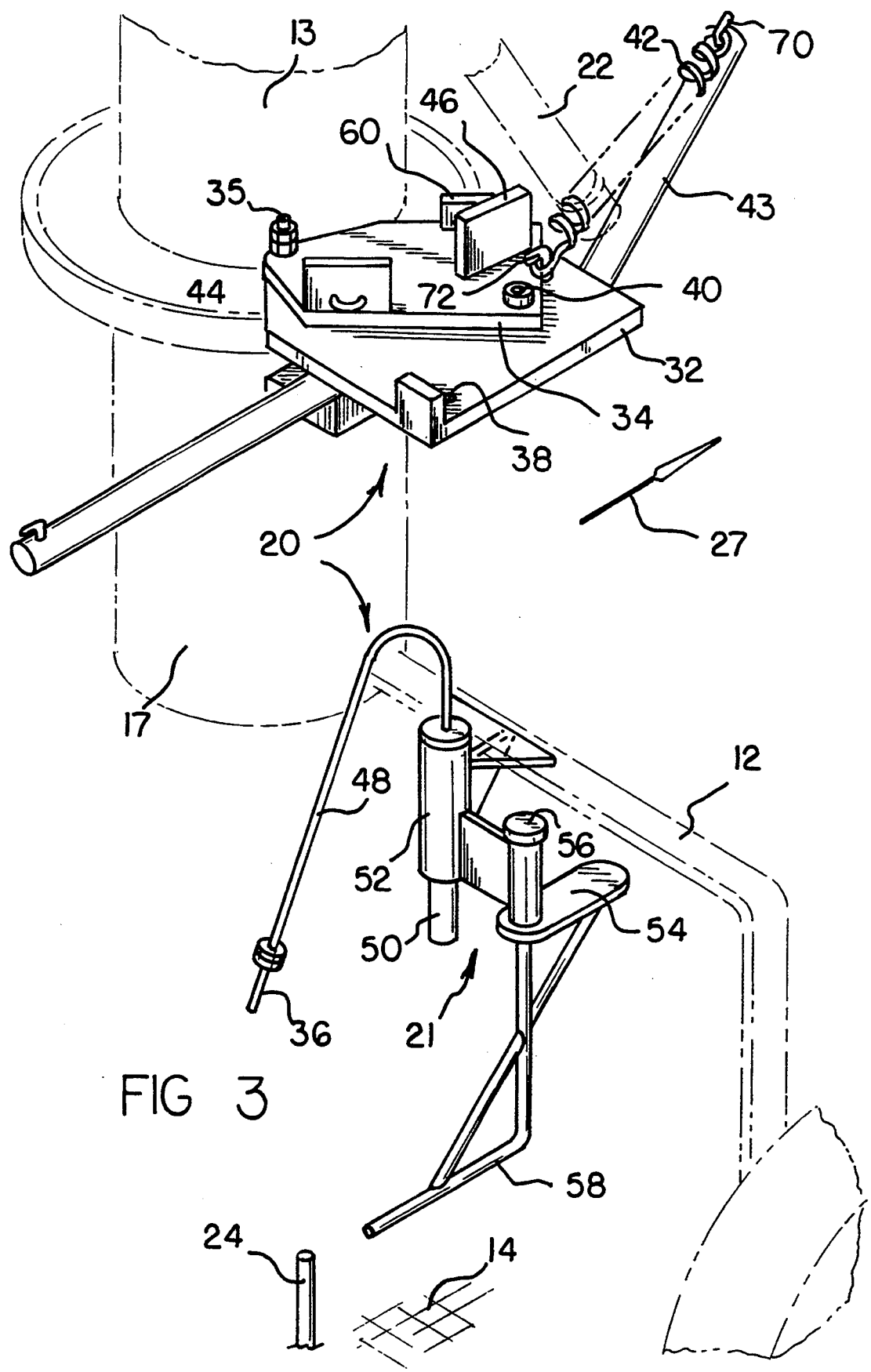
FIG. 3 is an enlarged perspective view of the first trip mechanism shown in FIG. 2 wherein the first trip mechanism has been tripped by a stake in the ground as the trolley is pulled toward the motorized spooler.
Figure 5:
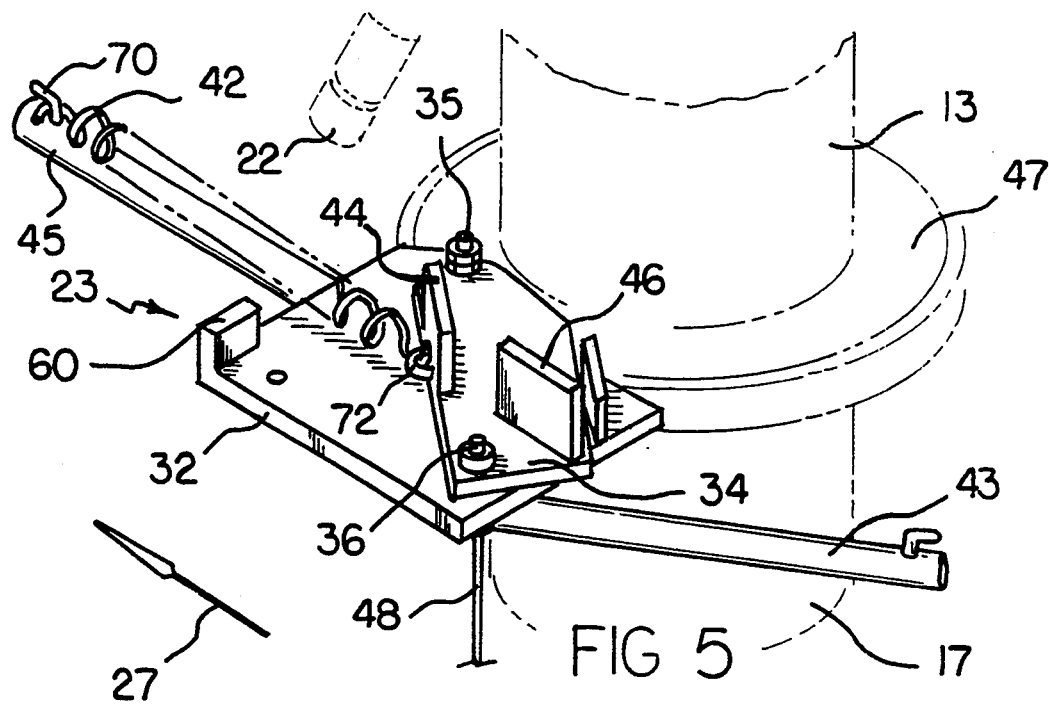
FIG. 5 is a perspective view of a second trip mechanism of the invention in an untripped condition.

Turning initially to FIGS. 1-3, there is shown an exemplary embodiment of the remotely controlled, moving sprinkler apparatus of the invention generally designated by reference numeral 10. The remotely controlled, moving sprinkler apparatus 10 of the invention is provided for use on a trolley 12 pulled across a field 14 to be sprayed with water. The sprinkler apparatus includes a rotatable sprinkler head assembly 16 carried by the trolley 12. The rotatable sprinkler head assembly 16 includes a stationary portion 17 supported by the trolley 12 and includes a rotatable portion 13, supported by the stationary portion 17, which is capable of rotating unidirectionally in repetitive full circles. The rotatable portion 13 is also capable of oscillating bidirectionally in partially circular arcs. A rotation direction control assembly 18 controls direction of rotation of the rotatable portion 13 of the rotatable sprinkler head assembly 16. The rotation direction control assembly 18 includes a revolving control element 22 connected to the rotatable portion of the rotatable sprinkler head assembly 16. The rotation direction control assembly 18 also includes a remotely controlled spray pattern selection assembly 20 which includes a first portion located adjacent to the stationary portion 17 of the rotatable sprinkler head assembly 16. The rotation direction control assembly 18 controls a water spray pattern on the field 14 by the remotely controlled spray pattern selection assembly 20 contacting the revolving control element 22. The trolley 12 is pulled by a motorized spooler 37 attached to a tractor 39 along a center line 41 of the field 14.

The remotely controlled spray pattern selection assembly 20 includes a first portion 19 located adjacent to the stationary portion 17 of the rotatable sprinkler head assembly 16. A second portion 21 of the first remotely controlled spray pattern selection assembly 20 is attached to the trolley 12. The first portion 19 is responsive to the second portion 21 and to a field-positioned actuator 24 located at a selected position in the field 14. The field-positioned actuator 24 actuates the second portion 21 of the remotely controlled spray pattern selection assembly 20 as the trolley 12 is pulled across the field 14 in the direction shown by arrow 27. The second portion 21 actuates the first portion 19 of the remotely controlled spray pattern selection assembly 20, and the first portion 19 contacts the revolving control element 22 of the rotatable sprinkler head assembly 16 for controlling direction of rotation of the rotatable sprinkler head assembly 16, such that a water spray pattern is controlled on the field 14 as the trolley 12 is pulled across the field 14.

The first portion 19 of the remotely controlled spray pattern selection assembly 20 includes a base plate 32 supported by the stationary portion 17 of the rotatable sprinkler head assembly 16. A pivoted trip plate 34 is placed on top of the base plate 32. A pivot 35 passes through the base plate 32 and the pivoted trip plate 34 for pivoting the pivoted trip plate 34, a set pin 36 is provided that is capable of being placed through a base plate set aperture 38 on the base plate 32 and through a trip plate set aperture 40 placed in registration with the base plate set aperture 38. A biasing spring 42 is supported by an extension post 43 on the base plate 32 and urges the pivoted trip plate 34 out of a set state, in which the set pin 36 is in position through the base plate set aperture 38 and the trip plate set aperture 40, and into a tripped state in which the set pin 36 has been removed from the base plate set aperture 38 and trip plate set aperture 40.

A first control surface 44 projects upward from the pivoted trip plate 34 and is located proximal to the pivot 35. The first control surface 44 contacts the revolving control element 22 for reversing a direction of rotation of the rotatable portion 13 of the rotatable sprinkler head assembly 16. A second control surface 46 projects upward from the pivoted trip plate 34 and is located distal to the pivot 35. The second control surface 46 contacts the revolving control element 22 for reversing the direction of rotation of the rotatable portion 13 of the rotatable sprinkler head assembly 16.

The base plate 32 includes a first stop element 60 for limiting motion of the pivoted trip plate 34 when the pivoted trip plate 34 moves from a set state to a tripped state. The second portion 21 of the first remotely controlled spray pattern selection assembly 20 includes a cable 48 connected to the set pin 36. A trip weight 50 is connected to the cable 48. A guide element 52 receives the trip weight 50. A trip platform 54 is capable of being positioned under the guide element 52 and the trip weight 50 for retaining the trip weight 50 in a set state as shown in FIG. 2.

Pivot 56 is connected to the trip platform 54, and a trip lever 58 is connected to the pivot 56, such that when the field-positioned actuator 24 is contacted by the trip lever 58 as the trolley 12 is moved along the field 14, the trip platform 54 is changed to a tripped state and the trip weight 50 falls. The cable 48 is pulled by the falling trip weight 50, and the set pin 36 is pulled out from its position through the base plate set aperture 38 and the trip plate set aperture 40 as shown in FIG. 3. Also as shown in FIG. 3, when the set pin 36, in the tripped state, having been pulled out from the base plate set aperture 38 and the trip plate set aperture 40, the biasing spring 42 pulls the pivoted trip plate 34 out of the set state into the tripped state. The arrow 59 shows the direction of movement of the trip lever 58 when the trip lever 58 contacts the field-positioned actuator 24 (the stake 24) as the trolley 12 moves in the direction indicated by arrow 27.

The rotatable sprinkler head assembly 16 and a rotation direction control assembly are disclosed in U.S. Pat. No. 3,559,887 of Meyer, patented Feb. 2, 1971, incorporated herein by reference. In U.S. Pat. No.

3,559,887, the rotatable sprinkler head assembly 16 is capable of rotating unidirectionally in repetitive full circles and is also capable of oscillating bidirectionally in partially circular arcs. The rotation direction control assembly disclosed in U.S. Pat. No. 3,559,887 includes a revolving control element 22 connected to the rotatable portion of the rotatable sprinkler head assembly 16 and includes at least one manually set reversal actuator assembly that is attached to a stationary portion 17 of the rotatable sprinkler head assembly 16. More specifically, two reversal actuator assemblies are employed and are manually set. After being manually set, the first reversal actuator assembly is struck by the revolving control element 22, which moves in an outer arced path, when the rotatable sprinkler head assembly 16 is rotating in one direction and causes the rotatable sprinkler head assembly 16 to reverse its direction of rotation. When the rotatable sprinkler head assembly 16 reverses direction of rotation, the revolving control element 22 is shifted in its path of movement to an inner arced path. Then, after the second manually set reversal actuator assembly is struck by the revolving control element 22, the path of movement of the revolving control element 22 shifts back to the outer arced path, and the rotatable sprinkler head assembly 16 is caused to reverse its direction of rotation again. In U.S. Pat. No. 3,559,887, the cycle is repeated over and over again to provide an oscillating spray pattern of the rotatable sprinkler head assembly 16 in accordance with the manual settings of the first and second reversal actuator assemblies.

However, in sharp contrast, in accordance with the present invention, the manually set reversal actuator assemblies of U.S. Pat. No. 3,559,887 are replaced with remotely controlled spray pattern selection assemblies 20 of the invention. The replacement of the manually set reversal actuator assemblies of U.S. Pat. No. 3,559,887 with the remotely controlled spray pattern selection assemblies 20 of the invention provide surprising and unexpected beneficial results which are stated below. The rotation direction control assembly 18 includes a revolving control element 22 connected to the rotatable portion 13 of the rotatable sprinkler head assembly 16, a first remotely controlled spray pattern selection assembly 20, as shown in FIGS. 2–4 and 7–9, which includes a first portion located adjacent to the stationary portion 17 of the rotatable sprinkler head assembly 16, and a second remotely controlled spray pattern selection assembly 23, as shown in FIGS. 2 and 4–9, which includes a first portion located adjacent to the stationary portion 17 of the rotatable sprinkler head assembly 16.

Figure 4:
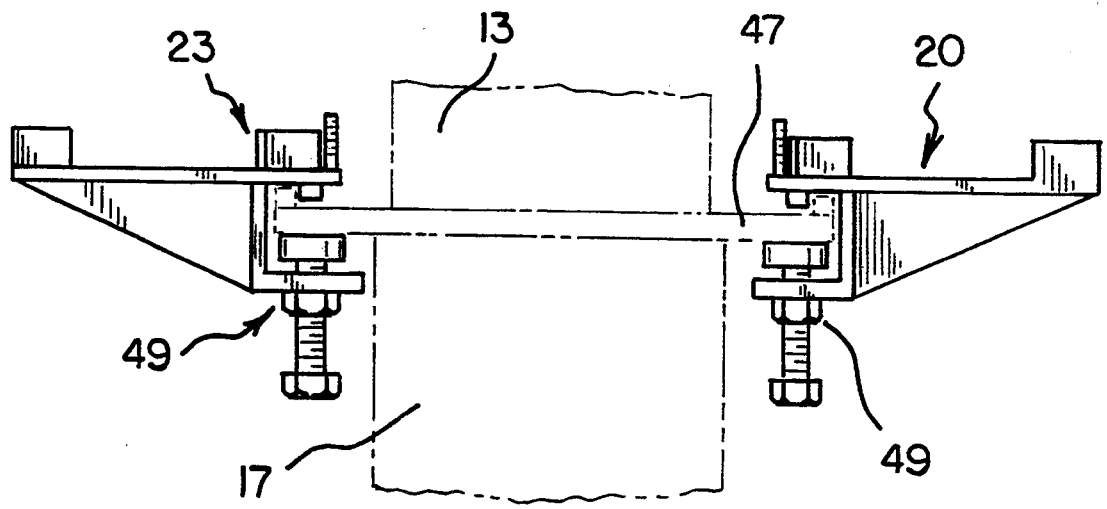
FIG. 4 is a side view of the first and second trip mechanisms of the invention used for controlling operation of the irrigation sprinkler.
Figure 6:
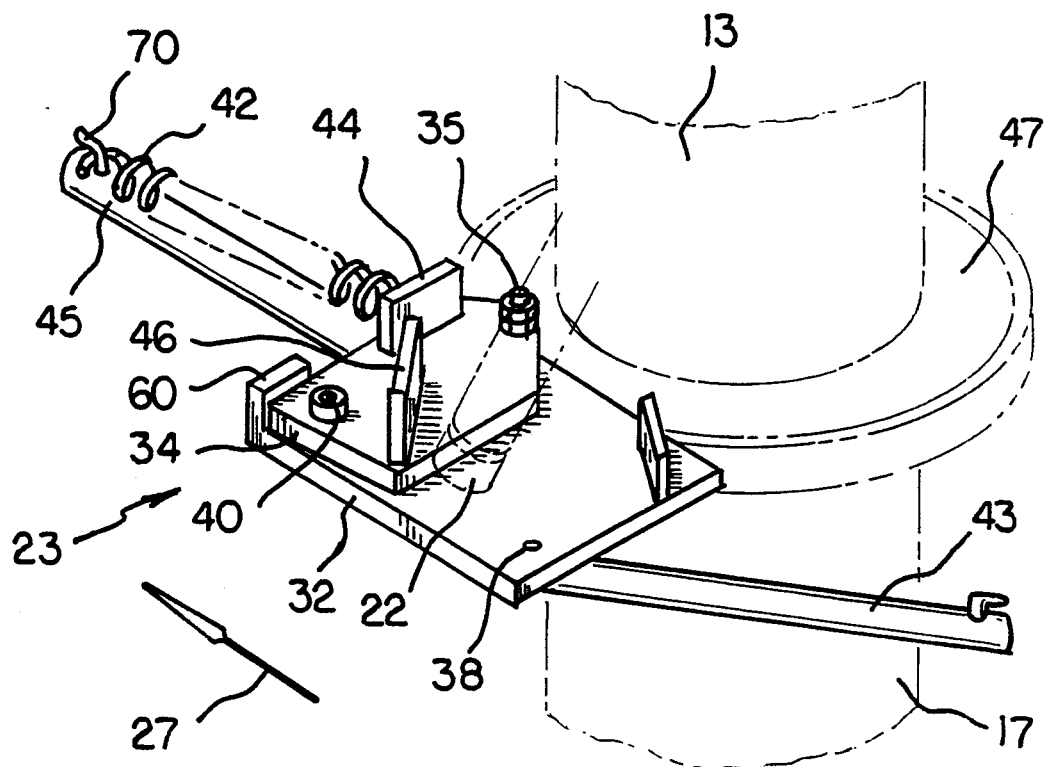
FIG. 6 is a perspective view of the second trip mechanism of the invention shown in FIG. 5 wherein the trip mechanism is in the tripped condition.
Figure 7:
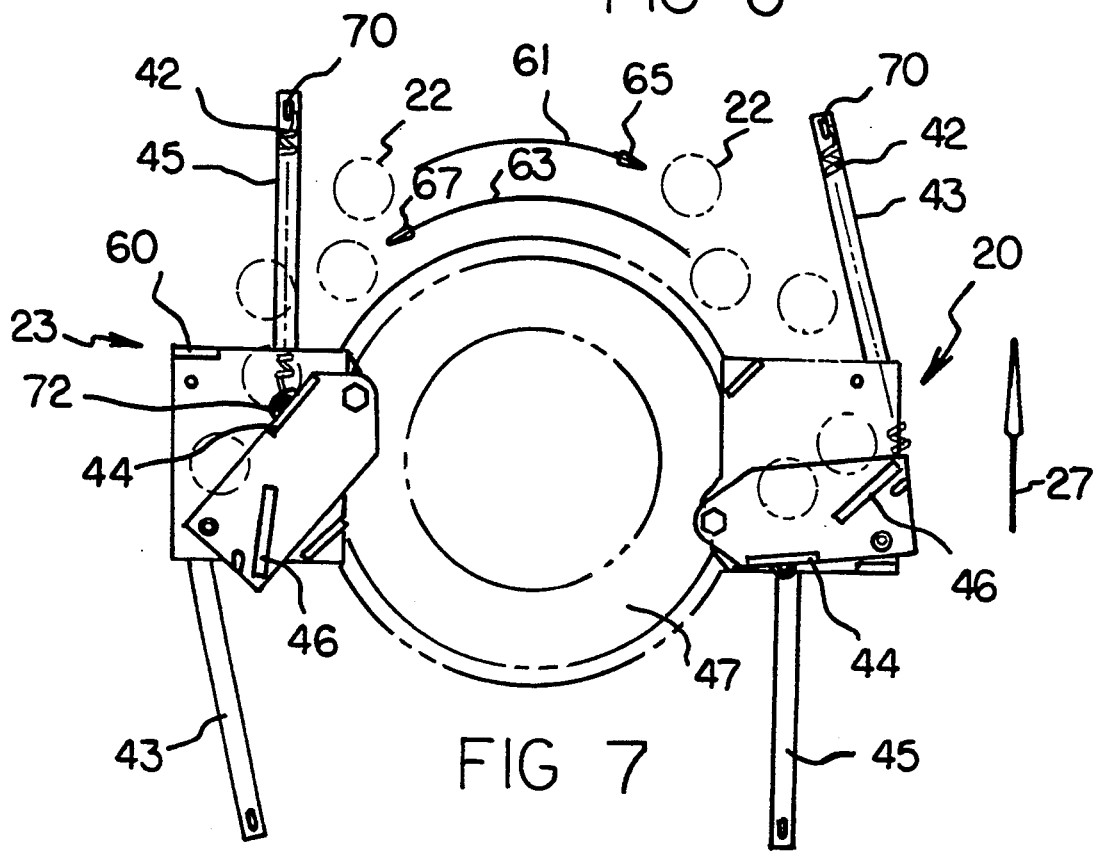
Figure 8:
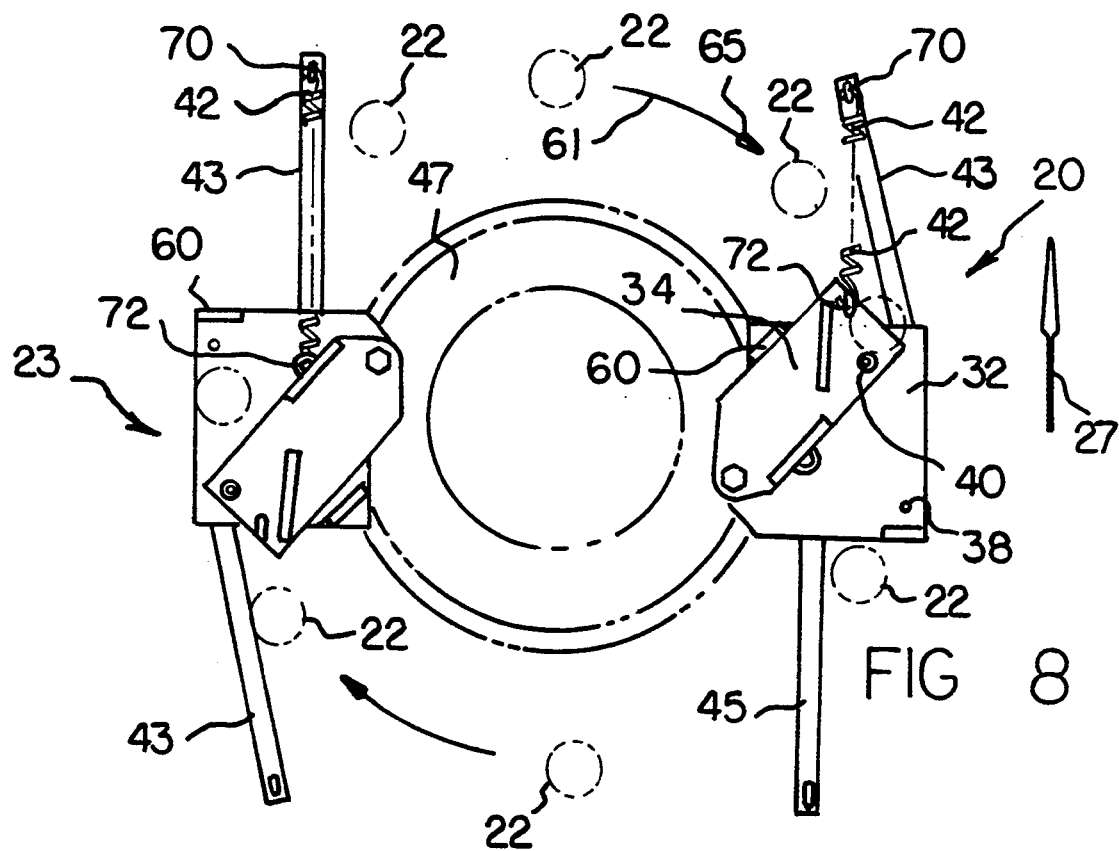
Figure 9:
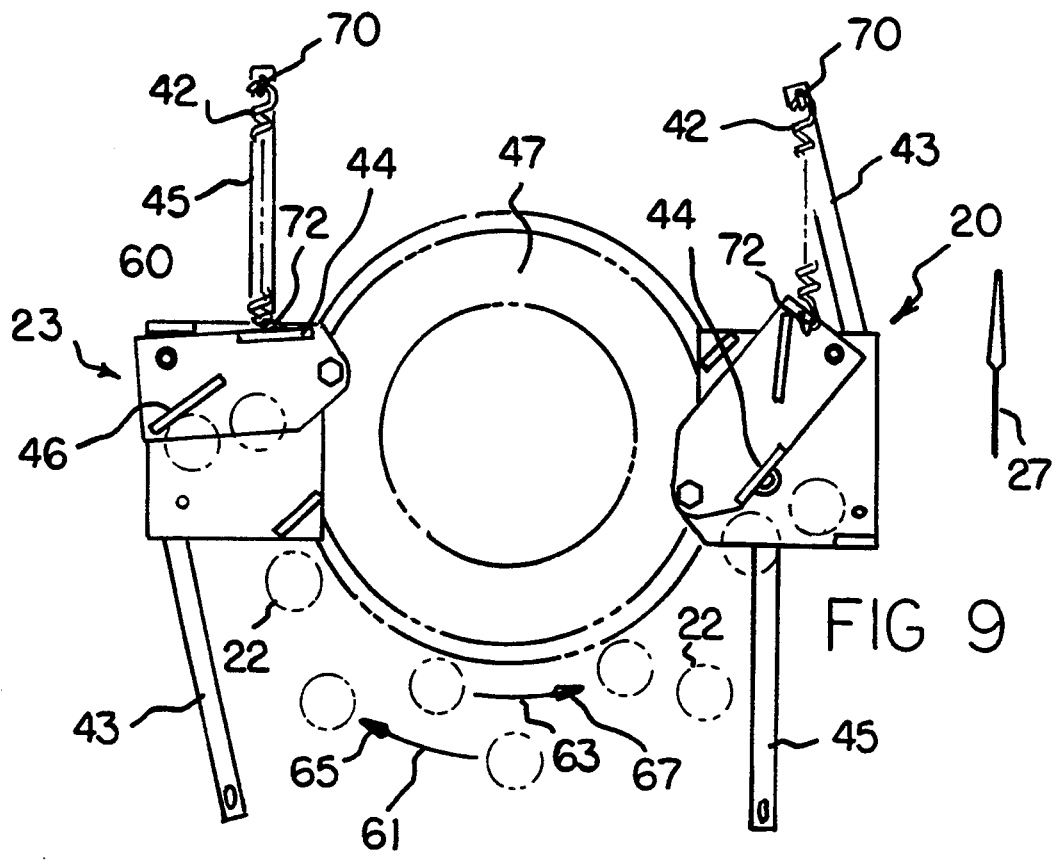

The first remotely controlled spray pattern selection assembly 20 includes a set state and a tripped state. The set state of the first remotely controlled spray pattern selection assembly 20 is shown in FIGS. 2, 4, and 7. The tripped state of the first remotely controlled spray pattern selection assembly 20 is shown in FIGS. 3, 8 and 9. The second remotely controlled spray pattern selection assembly 23 includes a set state and a tripped state. The set state of the second remotely controlled spray pattern selection assembly 23 is shown in FIGS. 2, 4, 5, 7, and 8. The tripped state of the second remotely controlled spray pattern selection assembly 23 is shown in FIGS. 6 and 9.

As shown in FIG. 1, water is sprayed in an oscillating, partially circular pattern of arcs 29 on the field 14 away from a first width side 28. This spray pattern occurs when, as shown in FIG. 7, the first remotely controlled spray pattern selection assembly 20 is in a set state and when the second remotely controlled spray pattern selection assembly 23 is in a set state. More specifically, when the revolving control element 22 rotates along the outer arced path 61 in the direction indicated by the arrowhead 65, the second control surface 46 of the first remotely controlled spray pattern selection assembly 20 is contacted by the revolving control element 22, and the revolving control element 22 shifts to the inner arced path 63 and moves in the reverse direction indicated by the arrowhead 67. When the revolving control element 22 hits the first control surface 44 of the second remotely controlled spray pattern selection assembly 23, the revolving control element 22 shifts to the outer arced path 61 in the direction of arrowhead 65. This oscillation pattern of the revolving control element 22 and the corresponding rotatable portion 13 of the rotatable sprinkler head assembly 16 repeats over and over again causing a spray pattern in which spray is aimed away from the first width side 28 of the field 14. This spray pattern continues until a field-positioned actuator 24 is encountered in the field 14.

As shown in FIG. 1, a first field-positioned actuator 24 (a first stake 24) is positioned along the center line 41 at a distance approximately ($\frac{1}{2}$)W from the first width side 28. As the trolley 12 passes by the first stake 24, the first remotely controlled spray pattern selection assembly 20 is changed from the set state to the tripped state. As shown in FIG. 1, water is sprayed in a unidirectional, full circular pattern 31 on the field 14 when, as shown in FIG. 8, the first remotely controlled spray pattern selection assembly 20 is in a tripped state and when the second remotely controlled spray pattern selection assembly 23 is in a set state. More specifically, with the first remotely controlled spray pattern selection assembly 20 is in the tripped state, the revolving control element 22 stays in the outer arced path 61 in the direction of arrowhead 65. The revolving control element 22 makes full circles repetitively. In this condition, neither the first remotely controlled spray pattern selection assembly 20 nor the second remotely controlled spray pattern selection assembly 23 impedes full circular rotation of the rotatable portion 13 of the rotatable sprinkler head assembly 16. This full circular water spray pattern continues until a second field-positioned actuator 25 is encountered in the field 14.

As shown in FIG. 1, a second field-positioned actuator 25 (a second stake 25) is positioned in the field at a distance approximately ($\frac{1}{2}$)W from the second width side 30. As the trolley 12 passes by the second stake 25, the second remotely controlled spray pattern selection assembly 23 is changed from the set state to the tripped state. As shown in FIG. 1, water is sprayed in an oscillating, partially circular pattern 33 on the field 14 away from a second width side 30. This spray pattern occurs when, as shown in FIG. 9, the first remotely controlled spray pattern selection assembly 20 is in a tripped state and when the second remotely controlled spray pattern selection assembly 23 is in a tripped state. More specifically, with the second remotely controlled spray pattern selection assembly 23 in the tripped state, the revolving control element 22, which is moving in the outer arced path 61 in the direction of the arrowhead 65, contacts the second control surface 46 of the second remotely controlled spray pattern selection assembly 23. As a result, the revolving control element 22 shifts to the inner arced path 63 and moves in the direction of the arrowhead 67. The revolving control element 22 reaches the first control surface 44 of the tripped first remotely controlled spray pattern selection assembly 20 and is shifted to the outer arced path 61 in the direction of the arrowhead 65, which is a directional reversal. The water spray pattern that results from the operation of the invention shown in FIG. 9 is a partially circular spraying pattern aimed away from the second width side 30.

When the spraying of the field 14 is completed, the first remotely controlled spray pattern selection assembly 20 and the second remotely controlled spray pattern selection assembly 23 are both reset to the set state, and the trolley 12 and the rotatable sprinkler head assembly 16 are moved back to the starting position adjacent to the first width side 28.

It is noted that the first remotely controlled spray pattern selection assembly 20 and the second remotely controlled spray pattern selection assembly 23 are structurally identical, but they are used in different ways. With the first remotely controlled spray pattern selection assembly 20, the first extension post portion 43 supports the biasing spring 42. A second extension post portion 45 does not bear a spring and is not used. In contrast, however, with the second remotely controlled spray pattern selection assembly 23, the first extension post portion 43 is not used, and the second extension post portion 45 supports the biasing spring 42. The respective biasing springs 42 arc connected to the respective first and second extension post portions by hooks 70. Both the respective biasing springs 42 are connected to the respective pivoted trip plates 34 by hooks or loops 72. Both the respective base plates 32 have two base plate set apertures 38, one proximal to the first extension post portion 43 and one proximal to the second extension post portion 45. Both the respective base plates 32 have two stop members. One stop member is proximal to the first extension post portion 43, and the other stop member is proximal to the second extension post portion 45.

As shown in FIG. 4, both the first remotely controlled spray pattern selection assembly 20 and the second remotely controlled spray pattern selection assembly 23 are attached to a stationary annular ledge 47 of the stationary portion 17 by screw clamp assemblies 49. As used herein and in the appended claims the term "remote control" means the automatic actuation of the spray control assemblies 20 and 23 by engagement with the field-position actuators (e.g. stakes 24 and 25).

The components of the remotely controlled, moving sprinkler apparatus of the invention can be made from inexpensive and durable metal materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved remotely controlled, moving sprinkler apparatus that is low in cost, relatively simple in design and operation, and which may advantageously be used to reduce waste of water by not spraying surface areas that are not part of a field. With the invention, a remotely controlled, moving sprinkler apparatus is provided which keeps to a minimum or completely eliminates the surface area sprayed outside the area of the field. With the invention, a remotely controlled, moving sprinkler apparatus is provided which prevents water from pooling and puddling in middle portions of the field. With the invention, a remotely controlled, moving sprinkler apparatus is provided which does not spray the motorized spooler and the tractor when the trolley and the sprinkler are near the spooler and tractor. With the invention, a remotely controlled, moving sprinkler apparatus is provided which changes spraying patterns of the sprinkler without requiring a person to walk long distances along a field and without subjecting the person to being drenched by water from the sprinkler. With the invention, a remotely controlled, moving sprinkler apparatus is provided which does not require turning off the irrigation water supply when changes to the sprinkler spraying patterns are made. With the invention, a remotely controlled, moving sprinkler apparatus is provided which permits an irrigation system to operate automatically so that the irrigation system can be used at night without being attended to by personnel.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by LETTERS PATENT of the United States is as follows:

1. A new and improved sprinkler apparatus for use on a trolley pulled across a field to be sprayed with water, comprising:

a rotatable sprinkler head assembly carried by the trolley, wherein said rotatable sprinkler head assembly includes a stationary portion supported by the trolley, and includes a rotatable portion, supported by the stationary portion, which is capable of rotating unidirectionally in repetitive full circles and is also capable of oscillating bidirectionally in partially circular arcs, and a rotation direction control assembly for controlling direction of rotation of said rotatable portion of said rotatable sprinkler head assembly, wherein said rotation direction control assembly includes a revolving control element connected to said rotatable portion of said rotatable sprinkler head assembly, wherein said rotation direction control assembly also includes a remotely controlled spray pattern selection assembly which includes a first portion located adjacent to said stationary portion of said rotatable sprinkler head assembly, and wherein said rotation direction control assembly controls a water spray pattern on the field by said remotely controlled spray pattern selection assembly contacting said revolving control element.

2. The apparatus described in claim 1 wherein said first portion of said remotely controlled spray pattern selection assembly includes:
- a base plate supported by said stationary portion of said rotatable sprinkler head assembly,
- a pivoted trip plate placed on top of said base plate,
- a pivot passing through said base plate and said pivoted trip plate for pivoting said pivoted trip plate,
- a set pin capable of being placed through a base plate set aperture on said base plate and through a trip plate set aperture placed in registration with said base plate set aperture,
- a biasing spring, supported by said base plate for urging said pivoted trip plate out of a set state, when said set pin is in position through said base plate set aperture and said trip plate set aperture, into a tripped state when said set pin has been removed from said base plate set aperture and trip plate set aperture,
- a first control surface projecting upward from said pivoted trip plate and located proximal to said pivot, said first control surface for contacting said revolving control element for reversing a direction of rotation of said rotatable portion of said rotatable sprinkler head assembly, and
- a second control surface projecting upward from said pivoted trip plate and located distal to said pivot, said second control surface for contacting said revolving control element for reversing the direction of rotation of said rotatable portion of said rotatable sprinkler head assembly.

3. The apparatus described in claim 2 wherein said base plate includes a first stop element for limiting motion of said pivoted trip plate when said pivoted trip plate moves from a set state to a tripped state.

4. The apparatus described in claim 2 wherein said second portion of said first remotely controlled spray pattern selection assembly includes:
- a cable connected to said set pin,
- a trip weight connected to said cable,
- a guide element for receiving said trip weight,
- a trip platform capable of being positioned under said guide element and said trip weight for retaining said trip weight in a set state,
- a pivot connected to said trip platform, and
- a trip lever connected to said pivot, such that when said field-positioned actuator is contacted by said trip lever as the trolley is moved along the field, said trip platform is changed to a tripped state, such that said trip weight falls, said cable is pulled by said falling trip weight, and said set pin is pulled out from its position through said base plate set aperture and said trip plate set aperture.

5. A new and improved sprinkler apparatus for use on a trolley pulled across a field to be sprayed with water, comprising:
- a rotatable sprinkler head assembly carried by the trolley, wherein said rotatable sprinkler head assembly includes a stationary portion supported by the trolley, and includes a rotatable portion, supported by the stationary portion, which is capable of rotating unidirectionally in repetitive full circles and is also capable of oscillating bidirectionally in partially circular arcs, and
- a rotation direction control assembly for controlling direction of rotation of said rotatable portion of said rotatable sprinkler head assembly,
- wherein said rotation direction control assembly includes a revolving control element connected to said rotatable portion of said rotatable sprinkler head assembly,
- wherein said rotation direction control assembly also includes a remotely controlled spray pattern selection assembly which includes a first portion located adjacent to said stationary portion of said rotatable sprinkler head assembly, and
- wherein said rotation direction control assembly controls a water spray pattern on the field by said remotely controlled spray pattern selection assembly contacting said revolving control element,
- wherein said rotation direction control assembly further includes:
  - a second remotely controlled spray pattern selection assembly which includes a first portion located adjacent to said stationary portion of said rotatable sprinkler head assembly,
  - wherein said first remotely controlled spray pattern selection assembly is capable of being in a set state and a tripped state,
  - wherein said second remotely controlled spray pattern selection assembly is capable of being in a set state and a tripped state,
  - wherein water is sprayed in an oscillating, partially circular pattern of arcs on the field away from a first width side when said first remotely controlled spray pattern selection assembly is in a set state and said second remotely controlled spray pattern selection assembly is in a set state,
  - wherein water is sprayed in a unidirectional, full circular pattern on the field when said first remotely controlled spray pattern selection assembly is in a tripped state and when said second remotely controlled spray pattern selection assembly is in a set state, and
  - wherein water is sprayed in an oscillating, partially circular pattern on the field away from a second width side when said first remotely controlled spray pattern selection assembly is in a tripped state and when said second remotely controlled spray pattern selection assembly is in a tripped state.

* * * * *